(12) United States Patent
Anderson et al.

(10) Patent No.: US 12,186,808 B2
(45) Date of Patent: Jan. 7, 2025

(54) PROCESS FOR MANUFACTURING TOROID PARTS

(71) Applicants: Gary L. Anderson, St. Marys, PA (US); Peter G. Imbrogno, DuBois, PA (US); Kevin Brunner, Ridgway, PA (US)

(72) Inventors: Gary L. Anderson, St. Marys, PA (US); Peter G. Imbrogno, DuBois, PA (US); Kevin Brunner, Ridgway, PA (US)

(73) Assignee: Keystone Powdered Metal Company, St. Marys, PA (US)

( * ) Notice: Subject to any disclaimer, the term of this patent is extended or adjusted under 35 U.S.C. 154(b) by 0 days.

(21) Appl. No.: 18/544,855

(22) Filed: Dec. 19, 2023

(65) Prior Publication Data

US 2024/0157439 A1    May 16, 2024

Related U.S. Application Data

(60) Division of application No. 17/387,250, filed on Jul. 28, 2021, now Pat. No. 11,883,883, which is a continuation-in-part of application No. 15/977,320, filed on May 11, 2018, now Pat. No. 11,097,346.

(60) Provisional application No. 62/507,853, filed on May 18, 2017.

(51) Int. Cl.
| | | |
|---|---|---|
| *B22F 5/08* | (2006.01) | |
| *B22F 3/10* | (2006.01) | |
| *B22F 7/08* | (2006.01) | |
| *F16H 55/06* | (2006.01) | |
| *F16H 55/17* | (2006.01) | |

(52) U.S. Cl.
CPC ............ *B22F 5/085* (2013.01); *B22F 3/1007* (2013.01); *B22F 7/08* (2013.01); *F16H 55/06* (2013.01); *F16H 55/17* (2013.01); *B22F 2201/02* (2013.01); *B22F 2201/30* (2013.01); *B22F 2301/35* (2013.01); *F16H 2055/176* (2013.01)

(58) Field of Classification Search
CPC ............... B22F 7/08; B22F 5/08; B22F 5/085
See application file for complete search history.

(56) References Cited

U.S. PATENT DOCUMENTS

| | | |
|---|---|---|
| 2,913,819 A | 11/1959 | Andreotti |
| 5,315,245 A | 5/1994 | Schroeder et al. |
| 6,110,419 A | 8/2000 | Buckey-Golder |
| 6,592,809 B1 | 7/2003 | Anderson |
| 6,889,419 B2 | 5/2005 | Reiter, Jr. |
| 7,137,312 B2 | 11/2006 | Cole |
| 9,816,597 B2 | 11/2017 | Invernizzi |
| 10,213,832 B2 | 2/2019 | Hagimoto |

(Continued)

*Primary Examiner* — Jake Cook
(74) *Attorney, Agent, or Firm* — Alvin T. Rockhill

(57) ABSTRACT

It has been found that duplex monolithic parts can be manufactured in high volume at low cost by using powder metal technology to mold and sinter an inner component of the part into an outer component of the part. This technique reduces the cost of manufacturing intricate metal products by taking advantage of the attributes of powder metal technology in making the inner component of the part. The outer component of the part can be wrought machined, stamped or forged, or made by double press double sinter or forging a powder metal component of the part. In any case, this technique can beneficially be used in making a wide variety of toroid parts, such as gears, clutches, sprags, bearing races, one-way diodes, and the like.

20 Claims, 3 Drawing Sheets

(56) References Cited

U.S. PATENT DOCUMENTS

| | | |
|---|---|---|
| 10,292,265 B2 | 5/2019 | Kasuga |
| 10,371,244 B2 | 8/2019 | McCune |
| 2005/0163645 A1 | 7/2005 | Xu |
| 2007/0221005 A1 | 9/2007 | Geiman |
| 2017/0045136 A1 | 2/2017 | Taga |
| 2018/0080538 A1 | 3/2018 | Gebhart |

PROCESS FOR MANUFACTURING TOROID PARTS

This is a divisional of U.S. patent application Ser. No. 17/387,250, filed on Jul. 28, 2021, which is a continuation-in-part of U.S. patent application Ser. No. 15/977,320, filed on May 11, 2018 (which issued as U.S. Pat. No. 11,097,346 on Aug. 24, 2021), which claims the benefit of U.S. Provisional Patent Application Ser. No. 62/507,853, filed on May 18, 2017. The teachings of U.S. patent application Ser. No. 17/387,250, U.S. patent application Ser. No. 15/977,320, and U.S. Provisional Patent Application Ser. No. 62/507,853 are incorporated by reference herein in their entirety.

BACKGROUND OF THE INVENTION

Powder metal parts can typically be produced in high volume at a cost which is lower than the cost of manufacturing the part with wrought steel and subsequently machining or otherwise working the parts to desired dimensions. This is because powder metal technology can eliminate a substantial amount of the labor which is required to machine the part to attain the desired geometry. In some cases, desired shapes can only be made in a commercially viable manner by using powder metal technology.

Powder metal parts are made utilizing a process that in its simplest form involves compacting metal powder under high pressure in a mold to make a green metal part. The green metal part has little strength and is very brittle since the individual metal particles in the green metal article are not bonded together. Accordingly, to provide the green article with strength and durability the green article is sintered at an elevated temperature. The temperature at which the article is sintered is under the melting point of the metal yet high enough to result in the metal particles of the part bonding together by diffusion rather than by melting and re-solidification. The sintered metal part can then subsequently be finished using a variety of methods to attain desired characteristics. For instance, the sintered part can optionally be further worked by sizing, machining, shaving, hobbing, broaching, heat treating, carburizing, quenching, tempering, grit blasting, shot blasting, grinding, honing, forging, or the like to attain a final product with the desired characteristics.

There is a continuing demand for a wide variety of powder metal parts which are stronger, more durable, and can meet more and more stringent performance requirements. For instance, there is a need for powder metal toroids of all types, such as gears, bearing races, and one-way clutches which are stronger and more durable to provide a prolonged service life without failure and without compromising part tolerances and uniformity. It is, of course, also important for such parts to be capable of being manufactured using commercially viable techniques that can be implemented at a low overall cost. In accomplishing these objectives and to meet customer requirements for a specific product it would be highly desirable to have greater flexibility in being capable of tailoring the product and the manner in which it is manufactured to meet specific customer needs.

SUMMARY OF THE INVENTION

The present invention relates to a low cost technique for manufacturing parts of a generally toroidal shape, such as gears, bearing races, and one-way clutches, utilizing relatively low cost powder metal technology. The parts made employing this technology are strong, durable, and are capable of meeting stringent performance requirements without compromising tolerances or uniformity. The technique of this invention can be used in manufacturing parts of various geometries by power metal technology which could previously only be made via more labor intensive machining procedures. This invention offers the advantage of being capable of making desired toroidal parts with smaller and consequently less expensive forging presses which are more energy efficient. This leads to lower capital expenditures and lower operating costs. Additionally, the toroidal parts made in accordance with this invention are lighter which is highly advantageous in many applications, such as automotive and aviation products.

The subject invention more specifically relates to a method of manufacturing a high strength part which comprises (1) providing an external component having an external profile and an internal profile, wherein the external component is comprised of a double press double sinter or forged powder metal or a wrought metal; (2) compacting a powder metal composition within the internal profile of the external component to produce a green internal component having a desired internal profile; and (3) sintering the green internal component within the confines of the external component under conditions which allow for mechanical and metallurgical bonding between the internal component and the external component of the part. Among other things, this method offers the flexibility of being able to utilize different materials in the internal and external components of the part to achieve needed performance characteristics and/or to reduce total manufacturing costs.

The high strength metal parts made by utilizing the technique of this invention are comprised of an external component and an internal component, wherein the external component has an external profile and wherein the internal component has an internal profile. The external component is comprised of a double press double sinter or forged powder metal or a wrought metal and the internal component is comprised of a powder metal which forms a metallurgical bond to the external component of the part during sintering. In other words the toroidal parts which are manufactured in accordance with this invention have an outer layer which is comprised of a double press double sinter or forged powder metal or a wrought metal and an inner layer which is comprised of a sintered powder metal. These parts exhibit superior strength, superior durability, and lower weight as compared to parts made using conventional technology. Lower weight is achieved by virtue of the internal component of the toroidal part being of a reduced density which is within the range of 6.6 g/cc to 7.3 g/cc. The external component of the toroidal part has a much higher density which is within the range of 7.8 g/cc to 7.85 g/cc.

The subject invention more specifically reveals a metal ring with an outer higher strength component and an inner component wherein the inner component is sintered into the outer component of the ring. Such metal rings can have an inner component that is a one-way clutch and an outer component that is a helical gear. In certain embodiments of this invention the external profile is a gear face and/or the internal profile is a gear face. In some embodiments of this invention the external profile of the part can include teeth and/or the internal profile of the part can include teeth.

The present invention also discloses a method for manufacturing a duplex monolithic part which comprises (1) molding a powdered metal shape into the inside of a metal outer ring component to make a compacted part, and (2) sintering the compacted part within the outer ring component to make the duplex monolithic part. In this method the outer component can be a wrought machined component, a wrought stamped component, a wrought forged component, or a powdered metal double press double sinter component or a forged component. In any case, the outer ring component acts as a die for molding the inner component. This technique can beneficially be used in manufacturing a wide variety of toroid parts, such as gears, clutches, sprags, bearing races, one-way diodes, and the like. For example, it can be a highly efficient method for making a high quality one-way clutch within a helical gear.

Figure 1:
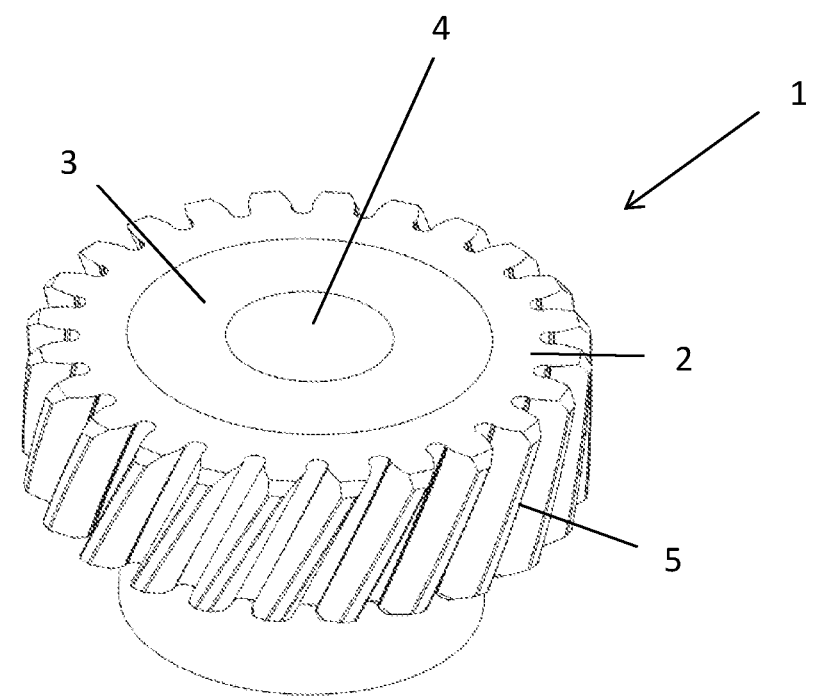
FIG. 1 illustrates a gear made in accordance with this invention having an outer component and an inner component.
Figure 2:
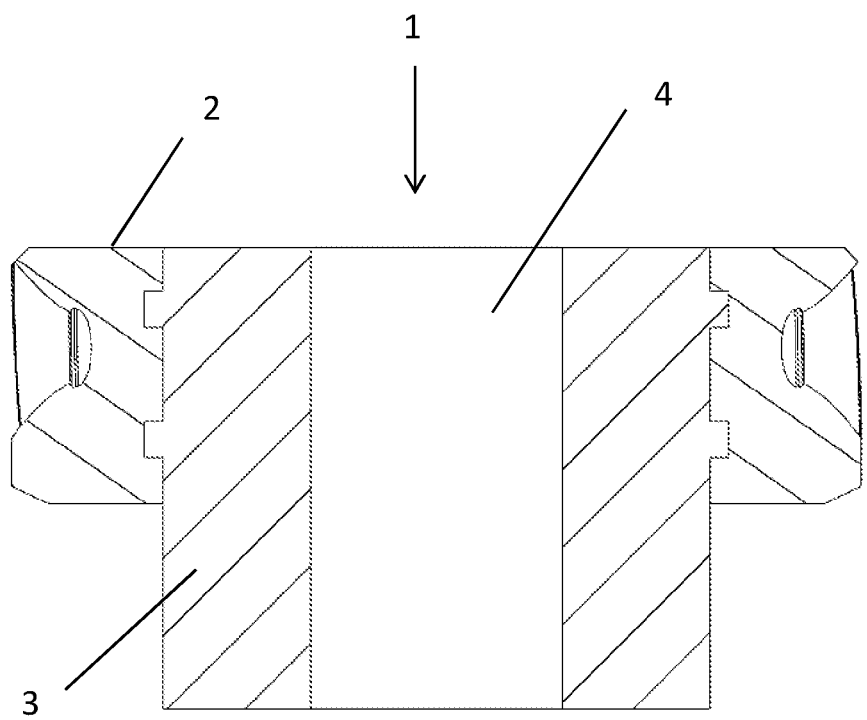
FIG. 2 is a cross sectional view of a gear made in accordance with this invention.
Figure 3:
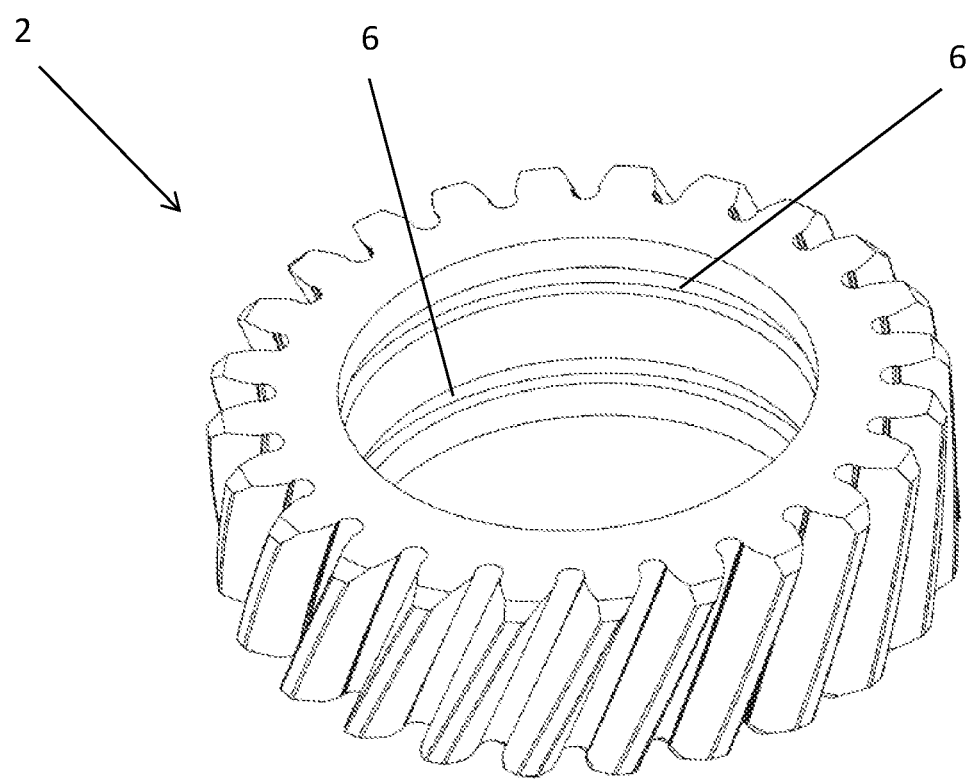
FIG. 3 illustrates the outer component ring which can be employed in manufacturing a gear in accordance with this invention. The outer component ring illustrated in FIG. 3 includes grooves on its inner surface to facilitate bonding with an inner component of the gear.

It should be understood that various aspects of the invention are presented in FIGS. 1-3 which may not be drawn to scale and which are not intended to be limiting with respect to the scope of the invention now being claimed. In most cases like components which are illustrated in the drawings are numbered using like reference numerals.

DETAILED DESCRIPTION OF THE INVENTION

The present invention will now be described in terms of the method which it employs in manufacturing high strength, durable toroidal parts, such a gears, bearing races, and one-way clutches. It should be understood that FIGS. 1-3 and the descriptions of the present invention provided herein have been simplified to illustrate elements that are relevant for a clear understanding of the present invention, while eliminating, for purposes of clarity, other elements and/or descriptions that are well-known to those skilled in the art. Those of ordinary skill in the art will recognize that other elements may be desirable in order to implement the present invention. However, because such elements are well known in the art, and because they do not facilitate a better understanding of the present invention, a discussion of such elements is not provided herein.

The toroidal parts of this invention are comprised of an external component (an external layer) and an internal component (an internal layer). FIG. 1 is an illustration of a gear 1 which was manufactured in accordance with this invention. As can be seen, this gear includes such an external component 2 and an internal component 3. As can be seen, the external component 2 includes an external gear face 5 which is situated on the outer radial surface of the gear 1. The external component 2 is comprised of a double press double sinter powder metal or forged powder metal or a wrought metal and is manufactured utilizing conventional techniques. A "wrought metal" is traditionally cast into a solid form which can be subsequently worked, such as by machining, forging, stamping, pressing, or another metal working technique, into a final form. The term "wrought metal" as used herein characterizes a full density metal that is cast from a molten (liquid) state rather than coming from a powder metal and being of a lower density. Accordingly, wrought metal internal components of the toroidal parts of this invention are comprised of a full density metal and are made by casting and optionally subsequent metal working steps. Such wrought metal internal components are not made with powder metals.

The internal component 3 of the gear 1 is comprised of a powder metal which has been formed within the confines of the external component 2 under pressure and sintered. Under optimum material combinations, during sintering, the internal component may 3 expands and by virtue of compressive forces against the external component 2 is thereby provided with higher strength of the internal component. This results in an increase in torsional and radial strength due to compressive load. In any case, the internal component 3 can be molded so as to have an internal profile of any desired shape, such as a gear face or a hexagon shaped hole, or in the case of the gear illustrated in FIG. 1 a circular shaped hole 4.

In the first step of the process of this invention the outer component of the toroidal part is manufactured employing conventional equipment and techniques. In one scenario the outer component is made with double press double sinter powder metal or forged powder metal and in yet another scenario the outer component of the part is made with a wrought metal. In one embodiment of this invention grooves can be included on inner surface of the outer component to facilitate strong bonding between the inner component and the outer component of the toroidal part. Such grooves 6 are shown on the outer component a gear as illustrated in FIG. 3.

The inner component of the part is molded in the outer component by placing a metal powder composition into a mold with the outer component of the part defining the outer periphery of the inner component. The powder metal is then compacted in the mold under a high pressure which is typically within the range of 20 tsi to 70 tsi (tons per square inch) and is preferably within the range of 40 tsi to 60 tsi. This results in the formation of an uncured or green inner component of the part which is contained radially within the outer component of the part. The part having the green inner component is then cured or sintered by heating the entire part in a sintering furnace, such as an electric or gas-fired belt or batch sintering furnace, for a predetermined time at high temperature in a protective atmosphere, such as under nitrogen, hydrogen, or argon. In any case the metal powders can be sintered in the solid state with bonding by diffusion rather than melting and re-solidification.

The metal powders that can be utilized in manufacturing high strength toroidal parts of this invention are typically a substantially homogenous powder including a single alloyed or unalloyed metal powder or a blend of one or more such powders and, optionally, other metallurgical and non-metallurgical additives such as, for example, lubricants. Thus, "metallurgical powder" may refer to a single powder or to a powder blend. There are three common types of powders used to make powder metal mixes and parts. The most common are homogeneous elemental powders such as iron, copper, nickel and molybdenum. These are blended together with other additives as desired to attain needed results, such as lubricants and graphite, and molded as a mixture. A second possibility is to use various alloyed powders, such as an iron-nickel-molybdenum-copper steel or iron-chromium-molybdenum-copper steel. In this case, the alloy is formed in the melt prior to atomization and each powder particle is a small ingot having the same composition as the melt. Again, additives of graphite, lubricant and elemental powders may be added to make the mix. A third type is known as "diffusion bonded" powders. In this case, an elemental powder, such as iron, is mixed with a second elemental powder, including copper, and is subsequently sintered at low temperatures so partial diffusion of the powders occurs. This yields a powder with fairly good compressibility which shows little tendency to separate during processing. While iron is the most common metal powder, powders of other metals such as aluminum, copper, tungsten, molybdenum and the like may also be used as long metal composition expands during sintering to a greater degree than does the metal utilized in the outer component of the part. Also, as used herein, an "iron metal powder" is a powder in which the total weight of iron and iron alloy powder is at least 50 percent of the powder's total weight. While more than 50% of the part's composition is iron, the powder may include other elements such as carbon, sulfur, phosphorus, manganese, molybdenum, nickel, silicon, chromium, and, of course, copper.

At least four types of metallic iron powders are available. Electrolytic iron, sponge iron, carbonyl iron and nanoparticle sized iron are made by a number of processes. Electrolytic iron is made via the electrolysis of iron oxide, and is available in annealed and unannealed form from, for example, OM Group, Inc., which is now owned by North American Höganäs, Inc. Sponge iron is also available from North American Höganäs, Inc. There are at least two types of sponge iron: hydrogen-reduced sponge iron and carbon monoxide-reduced sponge iron. Carbonyl iron powder is commercially available from Reade Advanced Materials. It is manufactured using a carbonyl decomposition process.

Depending upon the type of iron selected, the particles may vary widely in purity, surface area, and particle shape. The following non-limiting examples of typical characteristics are included herein to exemplify the variation that may be encountered. Electrolytic iron is known for its high purity and high surface area. The particles are dendritic. Carbonyl iron particles are substantially uniform spheres, and may have a purity of up to about 99.5 percent. Carbon monoxide-reduced sponge iron typically has a surface area of about 95 square meters per kilogram ($m^2/kg$), while hydrogen-reduced sponge iron typically has a surface area of about 200 $m^2/kg$. Sponge iron may contain small amounts of other elements, for example, carbon, sulfur, phosphorus, silicon, magnesium, aluminum, titanium, vanadium, manganese, calcium, zinc, nickel, cobalt, chromium, and copper. Additional additives may also be used in molding the preform for the inner component of the toroidal part being manufactured.

A more detailed description of metal powder compositions that can be used in the practice of this invention is given in U.S. patent application Ser. No. 14/974,498, filed on Dec. 18, 2015. The teachings of U.S. patent application Ser. No. 14/974,498 are incorporated herein by reference in their entirety. In any case, the metal powder composition used will normally include at least 2.5 weight percent to 5 weight percent copper and will frequently contain from 3 weight percent to 4 weight percent copper. In many cases, the metal powder composition will also contain from 0.2 weight percent to 1.5 weight percent molybdenum and from 0.2 weight percent to 4 weight percent nickel. In some cases it is advantageous for the metal powder composition to include from 0.1 weight percent to 2 weight percent graphite in addition to the copper.

The powder metal preform is then sintered. After being removed from the preform die, the toroidal part is typically placed in a sintering furnace where it is sintered at a temperature which is about 60% to about 90% of the melting point of the metal composition being employed. The sintering temperature will normally be in the range of 1700° F. (927° C.) to 2450° F. (1343° C.). The sintering temperature for the iron based compacts normally utilized in the practice of this invention will more typically be within the range of 2000° F. (1093° C.) to about 2400° F. (1316° C.). In any case, the appropriate sintering temperature and time-at-temperature will depend on several factors, including the chemistry of the metallurgical powder, the size and geometry of the compact, and the heating equipment used. Those of ordinary skill in the art may readily determine appropriate parameters for the molding steps to provide a green preform of suitable density and geometry which is then placed into a furnace at 2000° F. to 2450° F. for approximately 20 minutes under a protective atmosphere to sinter the metal. In any case, the sintering step with be conducted for a time and under conditions which allow for a metallurgical bonds to form between the external component and the internal component of the part.

As previously noted, the sintering temperature will typically be within the range of 2000° F. (1093° C.) to 2400° F. (1316° C.) and may be, for example, within the range of 2050° F. (1121° C.) to 2100° F. (1149° C.) for many iron-based preforms. Depending on, for example, the type of powder metal and the desired article, the sintering temperature can vary. After being sintered in the furnace the toroidal part is normally cooled to room temperature.

While certain representative embodiments and details have been shown for the purpose of illustrating the subject invention, it will be apparent to those skilled in this art that various changes and modifications can be made therein without departing from the scope of the subject invention.

What is claimed is:

1. A method for manufacturing a toroid part having a high strength outer component and an inner component, said method comprising (1) molding a powdered metal composition into the inside of a metal outer ring component to make a compacted part, wherein the metal outer ring is comprised of a cast metal having a density which is within the range of 7.8 g/cc to 7.85 g/cc, wherein the powder metal is compacted under a high pressure which is within the range of 20 tons per square inch to 70 tons per square inch, and (2) sintering the compacted part within the outer ring component to make the toroid part.

2. The method of claim 1 wherein the compacted part is sintered under a protective atmosphere.

3. The method of claim 2 wherein the protective atmosphere is a comprised of nitrogen atmosphere or a hydrogen atmosphere.

4. The method of claim 2 wherein the protective atmosphere is a carburizing atmosphere.

5. The method of claim 2 wherein the powdered metal composition includes iron, from 2.5 weight percent to 5 weight percent copper, from 0.2 weight percent to 1.5 weight percent molybdenum, and from 0.2 weight percent to 4 weight percent nickel.

6. The method of claim 2 wherein the part is sintered in a sintering furnace at a temperature which is within the range of 1700° F. to 2450° F.

7. The method of claim 2 wherein the inside of the metal outer ring component includes grooves to facilitate strong bonding between the inner component and the outer component of the toroid part.

8. The method of claim 2 wherein the metal outer ring component is a helical gear and wherein the inner component is a one-way gear.

9. The method of claim 1 wherein the toroid part has an internal component which is a gear face.

10. The method of claim 2 wherein the toroid part has an external component which is a gear face, and wherein the toroid part has an internal component which is a gear face.

11. The method of claim 2 wherein the inner component of the toroid part has a density which is within the range of 6.6 g/cc to 7.3 g/cc.

12. The method of claim 2 wherein the powder metal is compacted under a high pressure which is within the range of 40 tons per square inch to 60 tons per square inch.

13. The method of claim 2 wherein the part is sintered in a sintering furnace at a temperature which is within the range of 1800° F. to 2425° F.

14. The method of claim 2 wherein the part is sintered in a sintering furnace at a temperature which is within the range of 2000° F. to 2400° F.

15. The method of claim 2 wherein the part is sintered in a sintering furnace at a temperature which is within the range of 2000° F. to 2300° F.

16. The method of claim 2 wherein the part is sintered in a sintering furnace at a temperature which is within the range of 2050° F. to 2100° F.

17. The method of claim 1 wherein the outer ring component acts as a die for molding the inner component.

18. The method of claim 1 wherein the powder metal includes from 2.5 weight percent to 5 weight percent copper, from 0.2 weight percent to 1.5 weight percent molybdenum, and from 0.2 weight percent to 4 weight percent nickel.

19. The method of claim 18 wherein the powder metal further includes from 0.1 weight percent to 2 weight percent graphite.

20. The method of claim 19 wherein the powder metal includes from 3 weight percent to 4 weight percent copper.

\* \* \* \* \*